No. 857,280. PATENTED JUNE 18, 1907.
J. A. HICKS.
MEANS FOR LUBRICATING VALVES.
APPLICATION FILED NOV. 6, 1906.
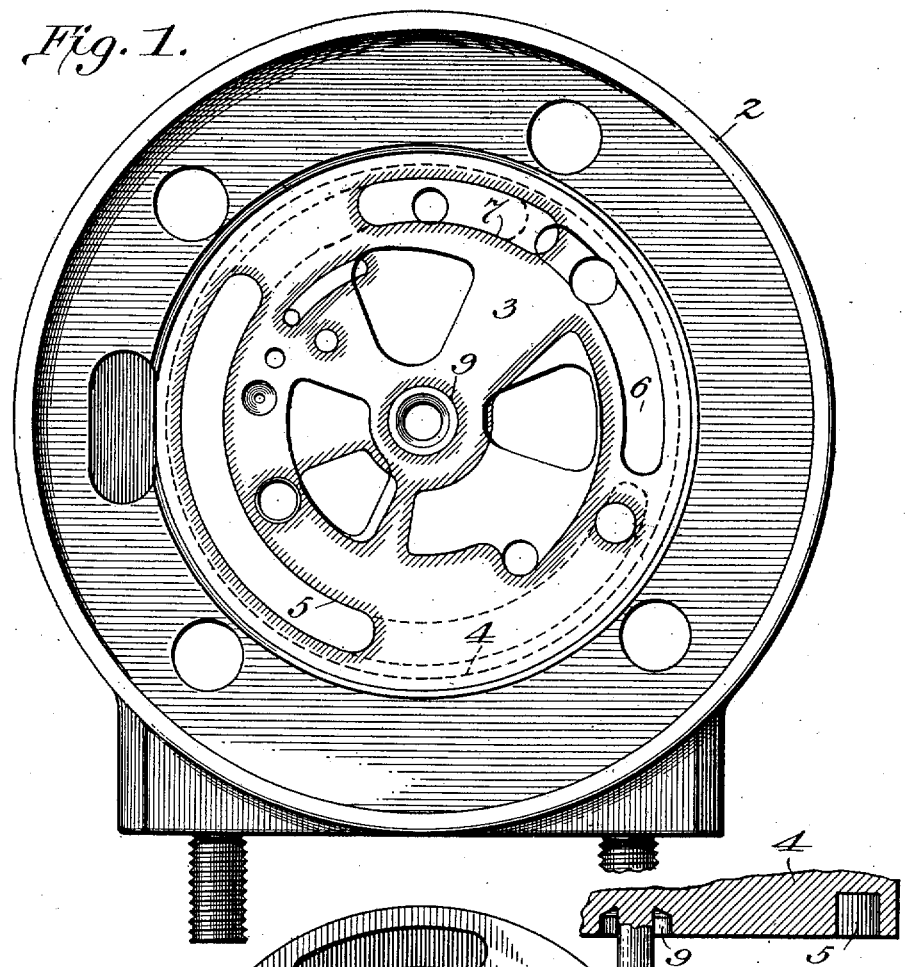
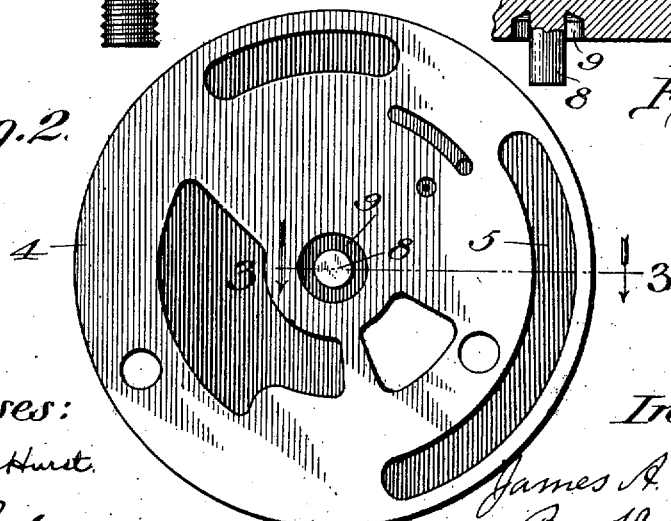
Witnesses:
Florence Hurst.
Inventor,
James A. Hicks
By H. L. Davis
Attorney.

UNITED STATES PATENT OFFICE.

JAMES A. HICKS, OF ATLANTA, GEORGIA.

MEANS FOR LUBRICATING VALVES.

No. 857,280.  Specification of Letters Patent.  Patented June 18, 1907.

Application filed November 6, 1906. Serial No. 342,180

*To all whom it may concern:*

Be it known that I, JAMES A. HICKS, a citizen of Atlanta, residing at 171 Hill street, in the county of Fulton and State of Georgia, have invented certain new and useful Improvements in Means for Lubricating Valves, of which the following is a specification.

The present invention relates to means for lubricating valves, particularly rotary valves, and more especially that type of valve used in fluid pressure brake systems and commonly called "engineer's valves," for the reason that these valves are located in the locomotive cab and form the instrumentality by means of which the engineer controls the fluid pressure and manipulates his brakes. The work required of this valve necessitates a close fitting of the movable valve member to its valve seat, to the end that the efficiency of the system may not be impaired by reason of leakage at the valve, and at the same time the valve must be so fitted initially and so maintained in service, as to permit it to be readily operated by the engineer in applying and releasing his brakes. Considerable difficulty has been experienced in satisfactorily lubricating valves of this type for the reason that it is difficult, because of the fluid pressure present at all times in the valve, to properly place and properly retain between the valve parts the necessary lubricant.

Generally stated, my invention contemplates the provision of pockets or lubricant cellars in the face of one of the opposed valve members, in which a suitable lubricant can be placed so that it will be properly distributed upon and between the valve surfaces during the movements of the valve.

More specifically, my invention contemplates placing these lubricant cellars in the movable member of the valve and so arranging them relative to the parts of the valve seat as that danger of blowing the lubricant from the pockets and wasting it is eliminated, so that after a valve has been once packed with lubricant it will continue in serviceable and properly lubricated condition for a considerable period without renewal.

In order that the invention may be clearly understood to those skilled in the art I have illustrated in the accompanying drawings one embodiment of my invention and in said drawings:

Figure 1 is a plan view of the Hicks engineer's valve equipped with the present invention, the rotary member of the valve being diagrammatically shown and the line and extremes of travel of the oil cellar during movement of the valve being shown in dotted lines. Fig. 2 is a bottom plan view of the rotary valve member showing the arrangement of lubricant cellars. Fig. 3 is a view in cross-section, on line 3—3 of Fig. 2.

Referring to the drawings by numerals, like numbers indicating like parts in the several views, 2 designates an engineer's valve of the Hicks type, having the ports and passages necessary for train and engine brake service. The valve comprises the usual valve seat 3, upon which is placed in the usual manner the rotary valve member 4, the valve member 4 being diagrammatically illustrated in the plan view in Fig. 1. The said valve member 4, in addition to the ports and cavities necessary to a proper manipulation of the air, is provided with a pocket or cellar 5 to receive any suitable lubricant. The said pocket 5, as shown, is preferably arranged on an arc parallel with the circumferential arc of the valve body, and is placed near the outer circumference of the valve, this lubricant cellar 5 being of considerable depth to receive a quantity of lubricant. It will be seen that this lubricant cellar 5 is disposed out of the range of the ports and passages of the valve members so that as the valve member 4 is rotated on its seat 3 the cellar 5 does not traverse any of the ports or openings in the valve seat, and no blowing or disturbance of the lubricant by reason of air pressure in the cellar 5 can occur.

It will be observed that the cellar 5 is in circumferential alinement with the engine feed passage 6 in the valve seat 3, and the co-operating passage 7 in the valve member 4, but the cellar 5 is so disposed with relation to these engine feed passages as that in the partial rotation of the valve member 4 essential to a proper manipulation of the air, the cellar 5 never bridges the engine feed passage 6 in the valve seat 3, so that no pressure from these circumferentially placed ports ever reaches the cellar 5.

In operation the cellar 5 sweeps in a circular path over the face of the valve seat 3, depositing its lubricant thereon, and the lubricant thus deposited will work or creep across the face of the valve between the seat 3 and the valve 4 so as to uniformly and continuously lubricate the parts, this creeping or working over the valve faces being aided to some extent by the film of air which will sweep between the valve members.

In order that the pivot pin 8 of the valve 4, and the valve areas adjacent said pin, may be properly lubricated, I preferably provide the valve 4 with a circular cellar 9 surrounding the pivot 8, which cellar 9 is of sufficient size to carry the quantity of lubricant necessary to lubricate the pivot pin 8 and the valve surfaces adjacent such pin, without interfering with or communicating in any way with the several ports and passages with which the valve is provided.

From the foregoing it will be seen that I have provided a construction in which lubrication of tightly fitted valve members is readily and satisfactorily effected, in which no interference with lubricant by reason of fluid pressure within the valve can occur; and in which, therefore, the necessity for frequent renewal of lubricating medium is eliminated.

While I have shown the invention as applied to the well known Hicks engineer's valve, I wish it to be distinctly understood that this is for purpose of illustration only, as the invention may, within the skill of the mechanician, be adapted and used with equal facility with any of the rotary engineers' valves now in use, and I do not, therefore, limit myself to any of the details shown and described, except in so far as I am limited by the prior art to which this invention belongs.

What I claim as new and desire to protect by Letters Patent is:

1. A valve comprising opposed members having registering ports, and a lubricant cellar so disposed in the face of one of said members as to be out of the range of the ports in the other member during movement of the valve.

2. A rotary valve comprising opposed members having registering ports, and a lubricant cellar so disposed in the face of one of said members as to be out of the range of the ports in the other member during rotation of the valve.

3. A rotary valve comprising opposed members having registering ports, and a lubricant cellar circumferentially arranged in the face of one of said members outside of the range of the ports in the other member during rotation of the valve.

4. A rotary valve comprising opposed members having registering ports, and an arc-shaped lubricant cellar circumferentially disposed in the face of one of said members outside of the range of the ports in the other member during rotation of the valve.

5. A rotary valve comprising a ported valve seat, a ported valve movable thereon, and a lubricant cellar so disposed in the face of said movable valve as to be outside of the range of the valve seat ports during rotation of the valve.

6. A rotary valve comprising a ported valve seat, a ported valve movable thereon, a pivot pin on one of said valve parts, a lubricant cellar encircling said pin, and a second lubricant cellar so disposed in the face of one of said valve parts as to be outside of the range of the ports in the other valve part.

7. In a rotary valve, a ported valve seat, a ported valve movable thereon, a pivot pin on said movable valve, there being a lubricant cellar encircling said pin, and a second lubricant cellar so disposed in the face of said movable member, as to be outside of the range of the ports in the valve seat.

8. A rotary valve comprising a valve seat having radially and circumferentially arranged ports, a movable valve having radially and circumferentially arranged ports, and a lubricant cellar in the face of one of the valve members which is radially and circumferentially offset from the range of the ports in the other member.

In testimony whereof I affix my signature in presence of two witnesses.

JAMES A. HICKS.

Witnesses:
J. H. BLANCHARD,
F. H. HILL.